Nov. 21, 1961 A. D. BROWN 3,009,407
AUTOMATIC FLASH COMPENSATOR
Filed Sept. 9, 1959 4 Sheets-Sheet 4
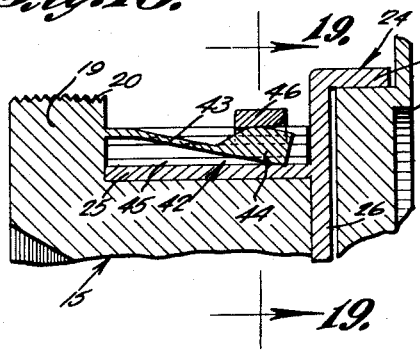
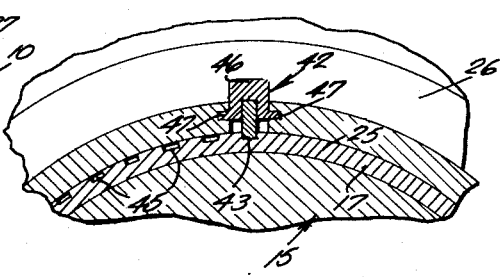
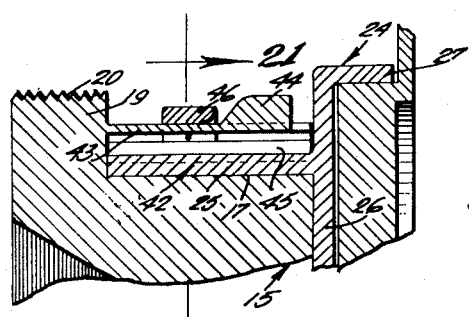
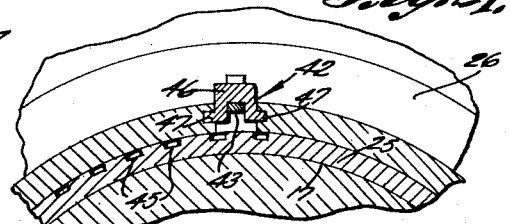
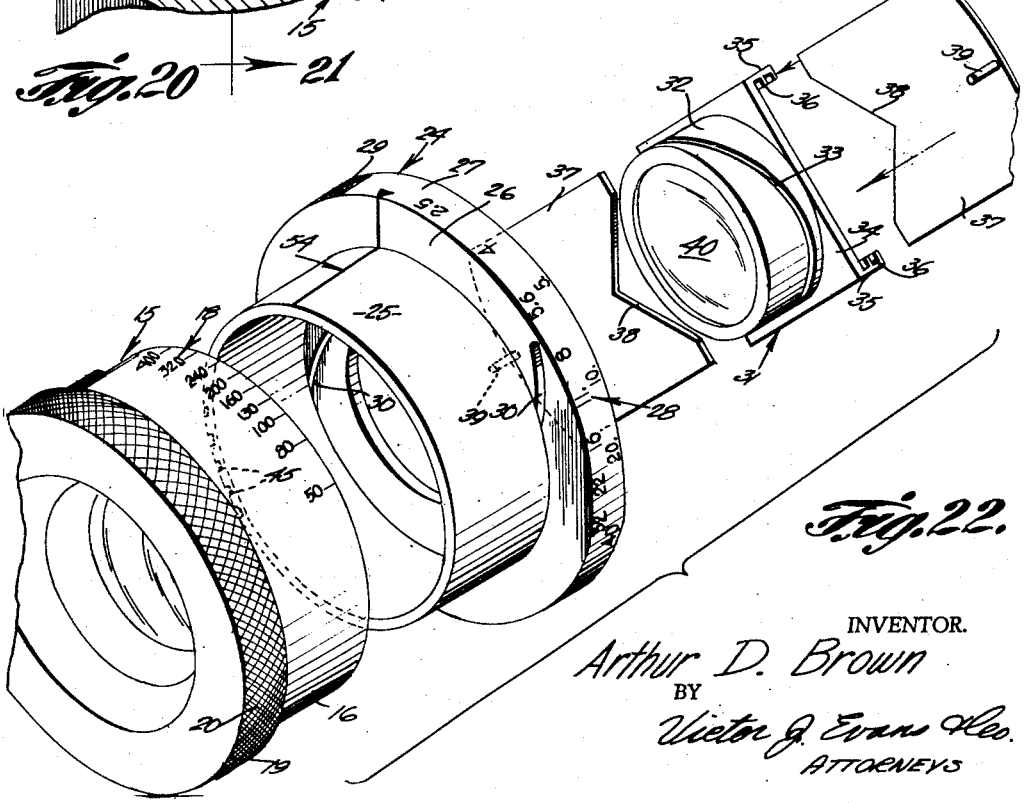
INVENTOR.
Arthur D. Brown
BY
Victor J. Evans & Co.
ATTORNEYS

United States Patent Office 3,009,407
Patented Nov. 21, 1961

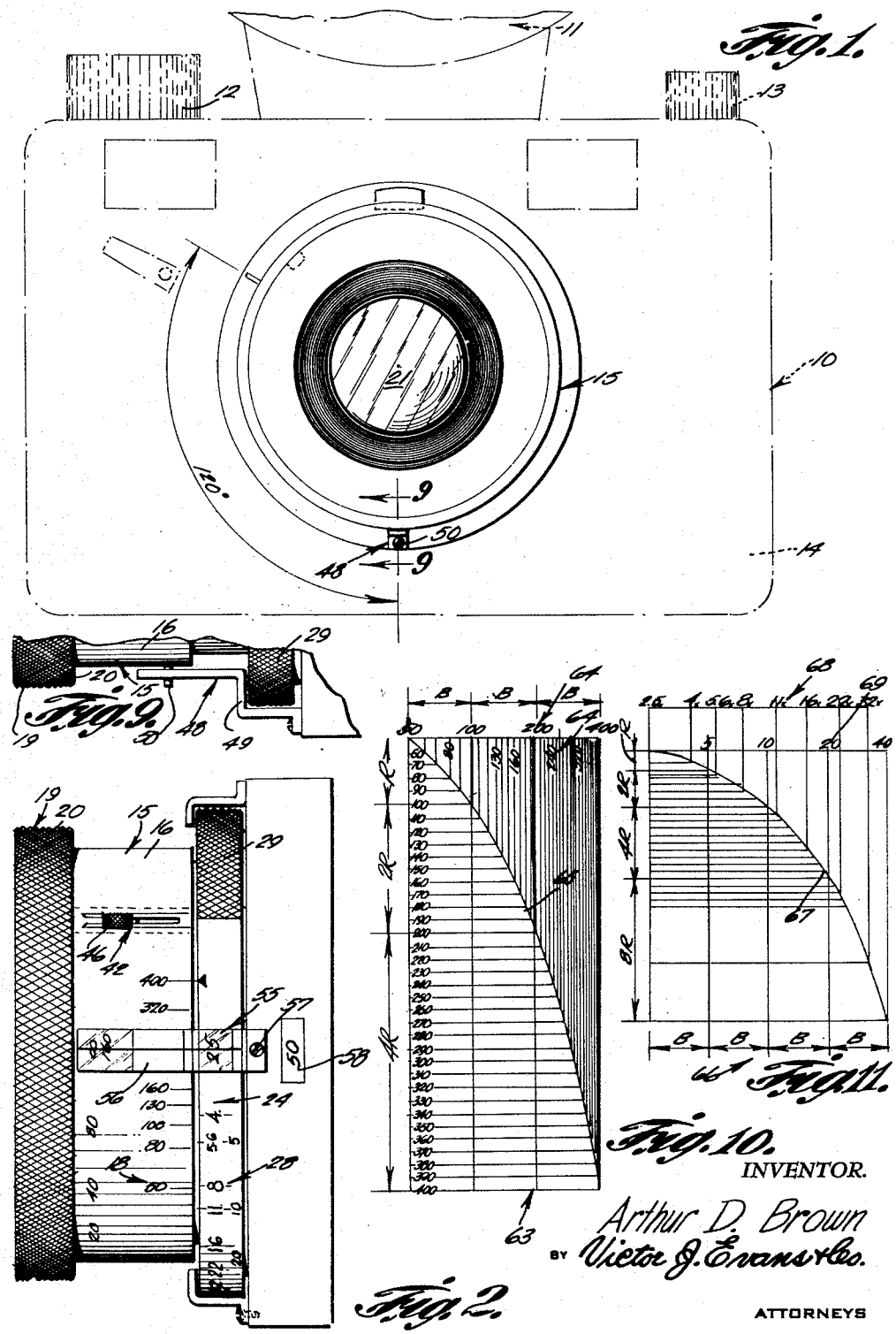

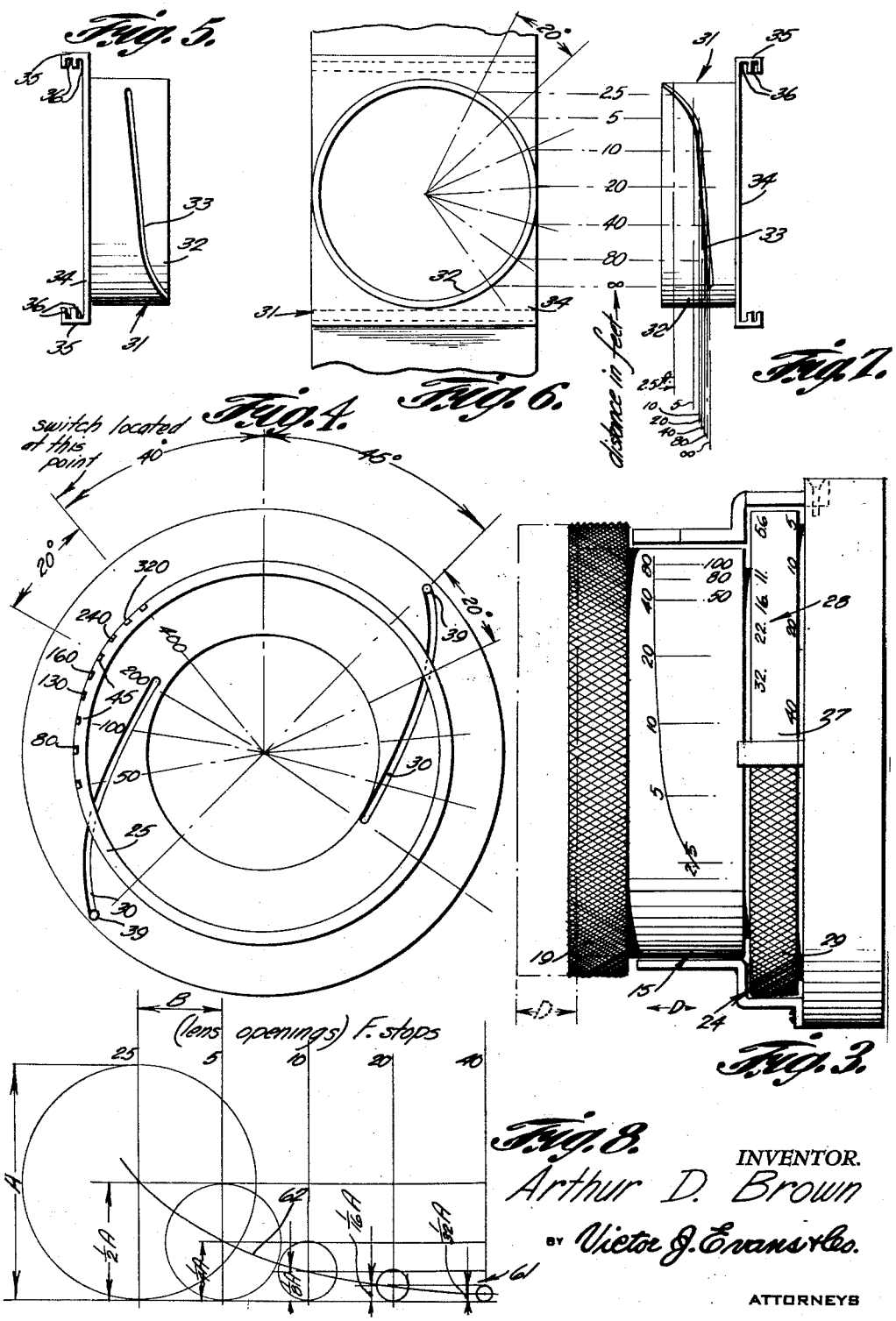

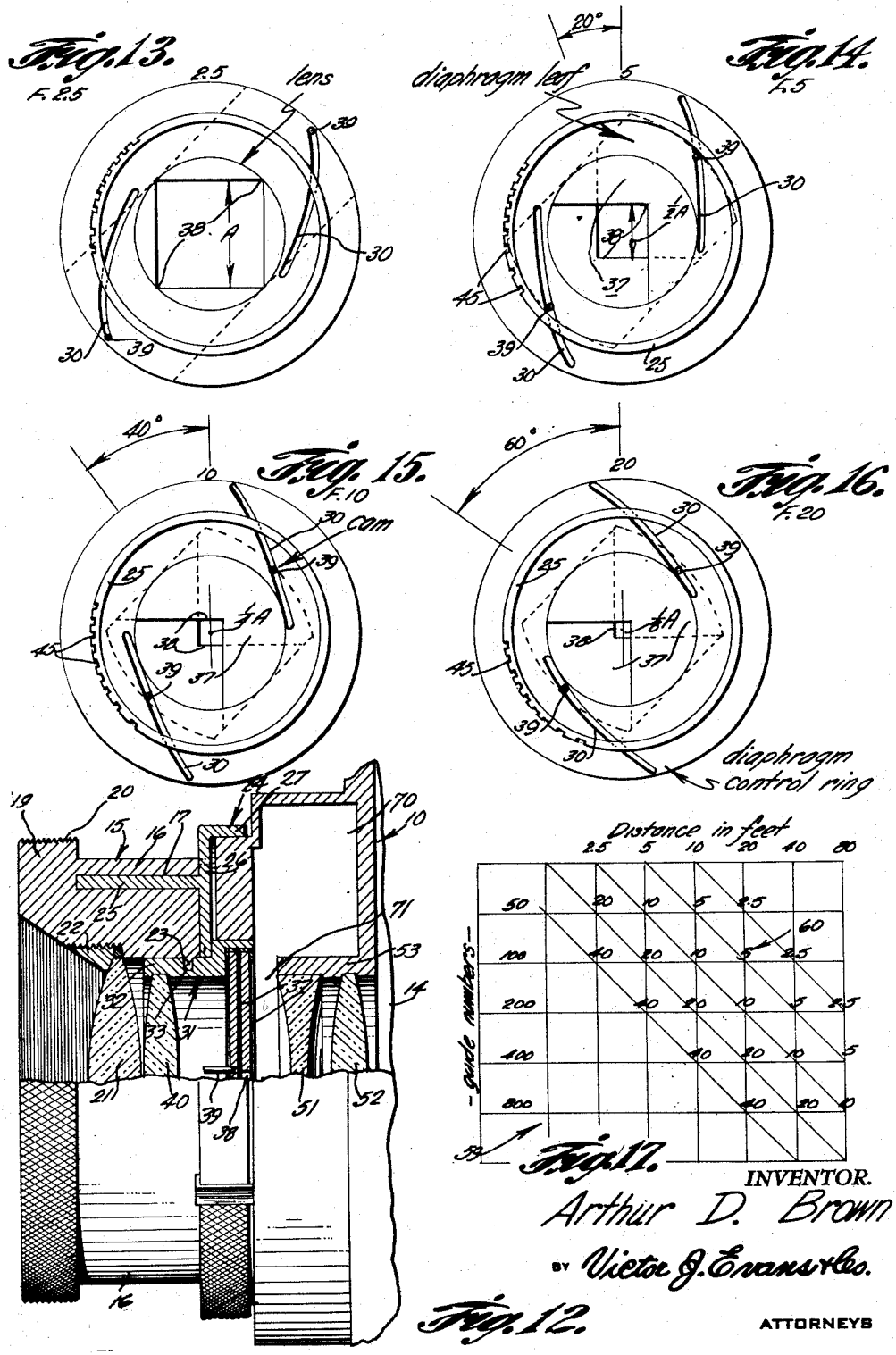

3,009,407
AUTOMATIC FLASH COMPENSATOR
Arthur D. Brown, P.O. Box 273, Mountain City, Tenn.
Filed Sept. 9, 1959, Ser. No. 838,936
2 Claims. (Cl. 95—64)

This invention relates to the art of photography, and more particularly to an automatic flash compensator for a camera.

The object of the invention is to provide an automatic flash compensator which will simplify the computing and setting of an adjustable camera, as for example when flash pictures are being made.

Another object of the invention is to provide an automatic flash compensator which will eliminate setting of the diaphragm (F-stop setting) which controls the amount of light entering the camera as for example when flash pictures are being made.

A further object of the invention is to provide an automatic flash compensator which is extremely simple and inexpensive to manufacture.

Other objects and advantages of the invention will be apparent in the course of the following description.

In the accompanying drawings, forming a part of this application, and in which like numerals are used to designate like parts throughout the same, FIGURE 1 is a front elevational view.
FIGURE 2 is a top plan view.
FIGURE 3 is a side elevational view.
FIGURE 4 is a front elevational view of the diaphragm control ring illustrating certain constructional details.
FIGURE 5 is a side elevational view of the support member.
FIGURE 6 is a view taken at right angles to the view shown in FIGURE 5.
FIGURE 7 is a view looking at the opposite side of the member of FIGURE 5.
FIGURE 8 is a view illustrating a curve which is plotted for the slot in the diaphragm control ring.
FIGURE 9 is a sectional view taken on the line 9—9 of FIGURE 1.
FIGURE 10 is a view illustrating how a curve is plotted using guide numbers which are equal distances apart.
FIGURE 11 is a view illustrating how the lens opening numbers are used to plot a curve by which the other lens opening markings to be used are obtained.
FIGURE 12 is an elevational view, with parts broken away in a section.
FIGURES 13 through 16 are views illustrating the movable plates which are used to form lens apertures of different sizes showing the plates in different positions and the aperture openings being of different sizes.
FIGURE 17 is a graph made up using guide numbers and distance in feet numbers and showing the resulting lens openings.
FIGURE 18 is a fragmentary sectional view illustrating the locking device.
FIGURE 19 is a sectional view taken on line 19—19 of FIGURE 18.
FIGURE 20 is a view similar to FIGURE 18 showing the parts in a different position.
FIGURE 21 is a sectional view taken on line 21—21 of FIGURE 20.
FIGURE 22 is a perspective view showing the parts disassembled.

Referring in detail to the drawings, the numeral 10 indicates a conventional camera which is adapted to be provided with the usual flash attachment 11, and the camera 10 is provided with control knobs 12 and 13, FIGURE 1 as well as the body member 14.

The present invention is directed to an automatic flash compensator which is shown to comprise a focusing lens mount that is arranged adjacent to the front of the body member, and the focusing lens mount which is indicated by the numeral 15 includes a main section 16 that is provided with an annular slot 17 therein, FIGURE 12. Numeral 18 indicates indicia which is arranged on the outer surface of the section 16, as for example as shown in FIGURE 2.

The mount 15 further includes on its outer end an enlarged shoulder 19 which is roughened or knurled as at 20 so as to facilitate the manual turning thereof. The numeral 21 indicates a front lens which is positioned within the mount 15, and a retainer 22 serves to maintain the lens 21 in its proper position, FIGURE 12. Cams or pins 23 extend inwardly from the mount 15 for a purpose to be later described.

There is further provided an adjustment ring which is indicated generally by the numeral 24, and the ring 24 includes an annular rim 25 which projects into the slot 17. The adjustment ring 24 further includes a circular back portion 26 as well as an annular flange 27. The outer surface of the flange 27 is provided with indicia or scale markings 28 as well as a roughened or knurled section 29, FIGURE 2. As shown in FIGURE 22 for example, the back portion 26 is provided with spaced apart arcuate grooves 30.

The numeral 31 indicates a support member which includes a cylindrical sleeve 32 that is provided with cut-outs or arcuate grooves 33 that receive the cams 23. The cams 23 and grooves 33 define an interengaging means on the lens mount 15 and sleeve 32 that insures that the elements 15 and 32 will be maintained in their proper position regardless of their adjusted locations. Secured to the sleeve 32 is a base 34 which has lips 35 extending therefrom, FIGURE 7, and the lips 35 are provided with grooves or tracks 36. The numeral 37 designates each of a pair of sliding plates or diaphragm leaves, the leaves 37 being slidably mounted in the tracks 36. Each of the leaves 37 is provided with a V-shaped recess or cutout 38. Pins 39 extend from the leaves 37 and are affixed thereto, and the pins 39 project through the grooves 30. The numeral 40 indicates a lens which is mounted in the support member 31.

There is further provided a manually operable locking device which is indicated generally by the numeral 42, and the locking device 42 includes a lever 43 which is secured to or formed integral with the shoulder 19 of the mount 15, FIGURE 18. The lever 43 is provided with an enlarged portion or shoulder 44, and the lever 43 is mounted for movement into and out of engagement with slots 45 in the rim 25 as a finger tab 46 is actuated or moved. The tab 46 is provided with retaining and guiding flanges 47.

As shown in FIGURES 1 and 9, there is further provided a limit stop device which is indicated generally by the numeral 48, and the stop device 48 includes a co-acting bar 49 and pin 50. As shown in FIGURE 12, other inner lenses 51 and 52 are mounted in a supporting section 53 of the camera.

From the foregoing, it is apparent that there has been provided an automatic flash compensator for a camera. The present invention will facilitate the computing and setting of cameras, as for example when flash pictures are being taken and it will eliminate the setting of the diaphragm (F-stop setting) between the lens which controls the amount of light entering the camera when making flash pictures. Some of the advantages of the present invention are as follows. Formerly after obtaining a guide number which is given on the back of the flash bulb containers and which is determined by the speed of film that is being used as well as the shutter speed and flash bulb, it was necessary to focus the camera and then divide the distance in feet from the flash to the subject into the guide number so as to then obtain another number which is called an F-stop number and then set this number on the camera before taking a picture.

With the present invention the proper guide number is chosen and the camera is simply set to that guide number and from then on the diaphragm opening is controlled automatically as the camera is focused. The present invention serves to connect the focusing lens mount 15 to the diaphragm control ring 24. The lens mount 15 when focused, moves in or out according to the distance, the diaphragm control ring 24 stays against the camera body. In order to connect members 15 and 24 together, the diaphragm control ring 24 is extended forward towards the front of the camera and is grooved as indicated by the numeral 45. The front focusing lens mount 15 is extended from the front of the camera backward over the extension 25 of the diaphragm control ring. The switch 42 is provided and is constructed so that when it is properly moved or actuated towards the camera body, it pushes the lever 43 down into one of the grooves 45 and the diaphragm control ring extends to 25 so as to connect the focusing lens mount 15 to the diaphragm control ring 24. The lever 43 slides along in the particular groove 45 in the diaphragm control ring 24 as the camera is focused so as to permit the diaphragm control ring to move in a circular motion in exactly the same direction and the same amount that the focusing lens mount 15 does but at the same time the diaphragm control ring does not move in or out. The lever 43 is adapted to be pushed down into one of the plurality of grooves or slots 45 in the diaphragm extension 25 by means of the switch 42 in order to permit relative axial movement between the lens mount and the diaphragm control ring without permitting relative movement in a circular direction. As shown in FIGURES 19 and 21, the flanges 47 are slidably mounted in slots in order to maintain the member 46 in its proper aligned position, and the member 46 serves to lock the lever 43 in a particular slot 45.

Some of the important aspects of features of the present invention are the extended portions of the focusing lens mount and the diaphragm control ring, as well as the grooves in the diaphragm control ring extension 25 and the lever 43 and switch 42 as well as the special calculations, which are necessary when computing the exact distance the focusing lens mount 15 must turn to focus the camera from the closest point to infinity so that it will exactly correspond to the right lens opening at any given distance.

The plurality of different grooves 45 in the extension 25 of the diaphragm control ring 24 are for different guide number settings, as for example 50–100–200–400, or any variation of these numbers. As shown in FIGURE 22, a red line 54 is adapted to be marked and grooved on the diaphragm control ring from front to back and the guide numbers are properly spaced and marked on the focusing lens mount. It is to be noted that when the switch 42 is disengaged, camera operation is completely unaltered by the present invention and it would only be engaged when making flash pictures.

The diaphragm adjustment ring has F-stop numbers thereon for manual setting and the F-stop numbers are read from the top for convenience. On the focusing lens mount, distance in feet is read from the top. The cam or stud 23 is formed integral with or secured to mount 15.

A diaphragm mechanism is also provided which controls the amount of light which passes through the lens and it consists of three moving parts. The present invention, unlike previous devices, is accurate over the entire focusing range of the camera when taking flash pictures, at any guide number setting made. This assures that no matter what speed is used or what intensity flash bulb is used, the lens opening will always correspond exactly to the distance to which the camera is focused to permit the exact amount of light to enter the camera needed to properly expose the film after the proper guide number setting has been made. As is well known, the guide number is the number derived from the shutter speed which is used, as well as the film sensitivity and the intensity of the flashbulbs.

The present invention need not be attached to the camera and hooked up and then removed before taking pictures by daylight since one simple setting and the moving of a switch is all that is necessary for converting from daylight photography to automatic light compensated flash photography. The complete operation takes only a very few seconds to accomplish and a simple disconnection of the switch and complete manual operation is restored.

Previously, the distance markings on the front focusing lens mount which was rotated to the front of the camera by means of threads attached to the camera body were non-linear to the "F" stop openings marked on the diaphragm control ring which opened or closed the diaphragm between the lens. In other words, the focus position of the lens and the corresponding desired appertures or lens openings were non-linear.

With the present invention the relationship is made to become linear due to the provision of a cam and groove which determines the amount the front focusing lens mount 15 must be rotated to focus the camera so that its movement corresponds to the diaphragm control ring movement which is cammed and slotted to obtain the desired openings, and this opens a closes the diaphragm between the lens the exact amount to maintain a constant amount of light entering the camera at any distance to which the camera is focused when a light source of any given intensity is mounted on the camera. The guide number settings of the present invention simply determine the diaphragm opening at a given starting point and the light entering the camera at the starting point is maintained constant throughout the remaining focusing process.

The front focusing lens mount 15 is rotated in order to focus the device, and the member 24 serves as a diaphragm control means. The double-tracks 36 permit the diaphragm leaves or plates 37 to slide back and forth. In FIGURE 2 the member 55 which is affixed in place by means of a screw 57 has a portion thereof blackened out as indicated by the numeral 56. Member 55 is a clear plastic indicator. At the point as indicated by the numeral 58, the shutter speed is indicated, FIGURE 2. Exact distances are plotted on the diaphragm ring between the numbers. The grooves 33 receive the cams on the focusing lens mount and one cam is provided for each groove, the cams being indicated by the numeral 33. The switch lever 43 operates in the grooves 45. In FIGURE 6 and 7 the numerals and lines indicate the method of plotting or accurately determining the shape of the curved groove 33. FIGURES 13 through 16 show the different positions of the cams and diaphragm leaves each time the control ring is rotated 20 degrees to the left and the resulting lens openings. FIGURE 13 corresponds to F2.5, FIGURE 14 corresponds to F5, FIGURE 15 corresponds to F10, and FIGURE 16 corresponds to F20. FIGURE 17 is a graph made up using guide numbers and distance in feet numbers and showing the resulting lens openings (F stops). Like F stop numbers are connected to form straight lines parallel to each other which proves this unique device is one hundred percent accurate at any guide number setting made at any distance at which it is focused.

In FIGURE 8 there is illustrated a graph 61 which shows a curve 62 that is plotted for the slots in the diaphragm control ring in which the cams move.

The stopping mechanism 48 serves to keep the focusing lens mount from coming completely out if a person should try to focus the camera closer than two and one half feet.

Referring to FIGURE 10 of the drawings, there is illustrated a graph 63 which is provided with guide numbers 64 and the numeral 64 indicates a curve which is adapted to be plotted. In FIGURE 10 there is illustrated how a curve 65 is plotted using the guide numbers which are equal distances apart, such as these guide numbers 50, 100, 200, and 400 and any desired guide number may then be obtained or plotted by a simple connection of lines as shown. The exact distances are obtained for plotting the desired guide numbers and marking them on the front focusing lens mount and for the corresponding guide number grooves on the extended portion of the diaphragm control ring.

In FIGURE 11 there is illustrated a diagram or graph 66 having a curve 67 thereon and the numeral 68 indicates lens opening numbers and the numbers 68 are the numbers which are to be plotted in slots on the diaphragm ring. The numbers 69 are small red equal distance numbers to be plotted on the diaphragm control ring and in FIGURE 11 there is illustrated how the lens opening numbers which are equal distances apart are used to plot a curve 67 and which the other lens opening markings to be used are obtained. The distances which are obtained are plotted along a line and are adapted to be projected to a center point so as to obtain the exact distance to be marked on the diaphragm control ring.

The line 54 serves as a guide number pointer, and the markings 28 function as lens opening markings. The slots 30 serve to open or close the diaphragm leaves, as the parts are rotated. The member 15 is rotated in order to focus the front lens 21.

The space 70 is provided for the shutter mechanism and the space 71 is provided for the shutter blades.

Minor changes in shape, size and rearrangement of details coming within the field of invention claimed may be resorted to in actual practice, if desired.

What is claimed is:

1. An automatic flash compensator for a camera comprising a focusing lens mount embodying a main section having an annular slot therein, indicia on the outer surface of said main section, said mount further embodying an enlarged knurled shoulder on the outer end thereof, a front lens positioned within said mount, pins extending inwardly from said mount, an adjustment ring adjacent said mount and said adjustment ring embodying an annular rim projecting into the slot in said mount, said ring further comprising a circular back portion and an annular flange, there being indicia on said flange, said back portion having a pair of spaced apart arcuate grooves, a support member embodying a sleeve of cylindrical formation having arcuate grooves for receiving said pins, a base secured to said sleeve, lips affixed to said base and said lips having trackways, a pair of diaphragm leaves slidably mounted in said trackways, pins connected to said leaves and extending into the grooves in said back portion, there being coacting V-shaped recesses in said leaves, a lens mounted in said support member, a locking device embodying a lever connected to the shoulder of the mount, there being a plurality of spaced apart slots in said rim for selectively receiving said lever, and a finger tab for selectively maintaining the lever engaged with the slot in said rim, said tab being provided with opposed guiding flanges thereon.

2. An automatic flash compensator for a camera comprising a focusing lens mount embodying a main section having an annular slot therein, indicia on the outer surface of said main section, said mount further embodying an enlarged knurled shoulder on the outer end thereof, a front lens positioned within said mount, pins extending inwardly from said mount, an adjustment ring adjacent said mount and said adjustment ring embodying an annular rim projecting into the slot in said mount, said ring further comprising a circular back portion and an annular flange, there being indicia on said flange, said back portion having a pair of spaced apart arcuate grooves, a support member embodying a sleeve of cylindrical formation having arcuate grooves for receiving said pins, a base secured to said sleeve, lips affixed to said base and said lips having trackways, a pair of diaphragm leaves slidably mounted in said trackways, pins connected to said leaves and extending into the grooves in said back portion, there being coacting V-shaped recesses in said leaves, a lens mounted in said support member, a locking device embodying a lever connected to the shoulder of the mount, there being a plurality of spaced apart slots in said rim for selectively receiving said lever, and a finger tab for selectively maintaining the lever engaged with the slot in said rim, said tab being provided with opposed guiding flanges thereon, and a limit stop device including a coacting bar and pin.

References Cited in the file of this patent

UNITED STATES PATENTS

| 2,213,749 | Strauss | Sept. 3, 1940 |
| 2,369,199 | Aiken | Feb. 13, 1945 |
| 2,549,230 | Parody | Apr. 17, 1951 |
| 2,550,698 | King et al. | May 1, 1951 |

OTHER REFERENCES

Deckel: German Application No. 1,021,703, printed Dec. 27, 1957.